Oct. 21, 1930.                H. N. COX                 1,778,754
                           OPTICAL SYSTEM
                        Filed Aug. 7, 1926            2 Sheets-Sheet 1
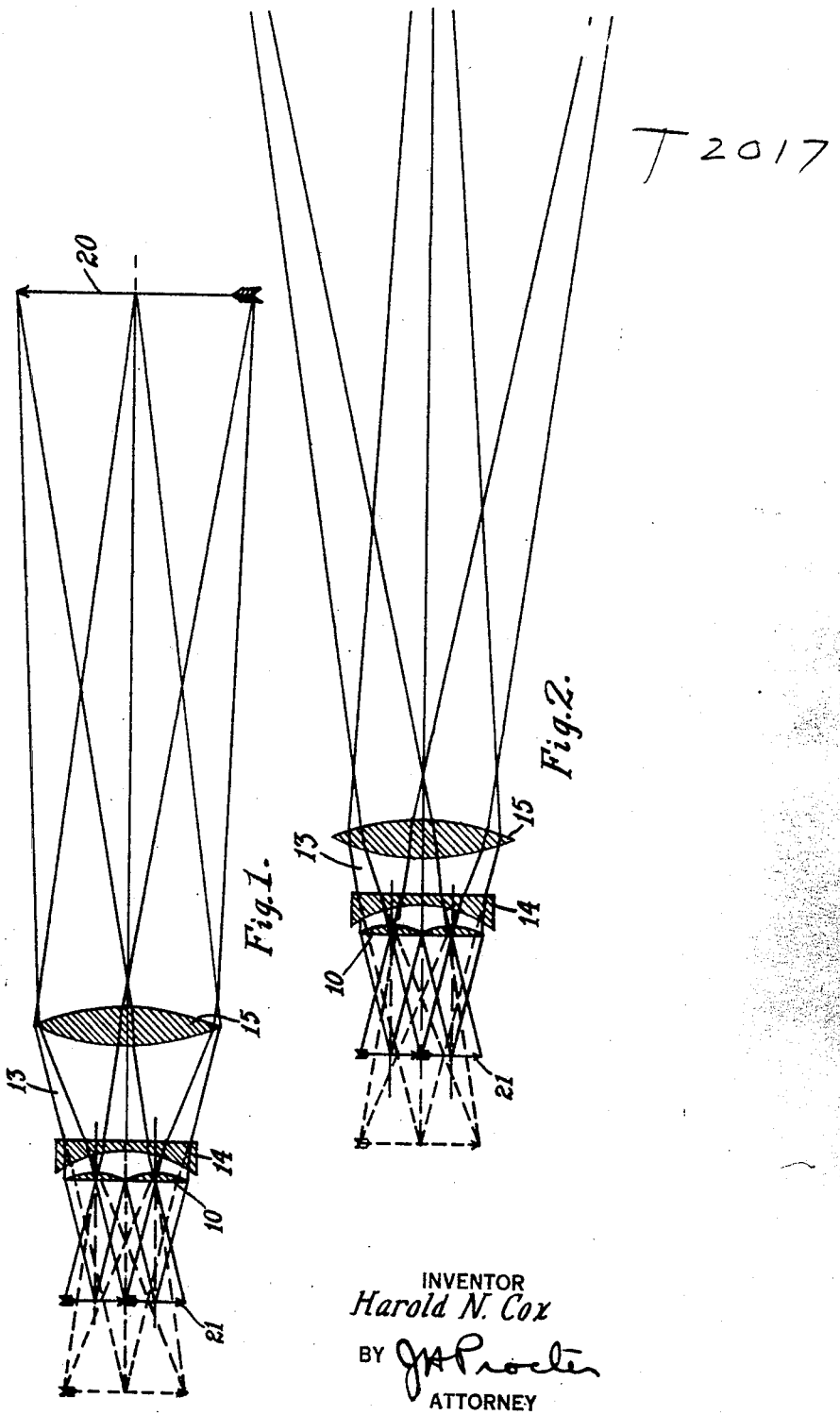
WITNESSES:                                   INVENTOR
                                          Harold N. Cox
                                          BY
                                             ATTORNEY Oct. 21, 1930.  H. N. COX  1,778,754
OPTICAL SYSTEM
Filed Aug. 7, 1926   2 Sheets-Sheet 2
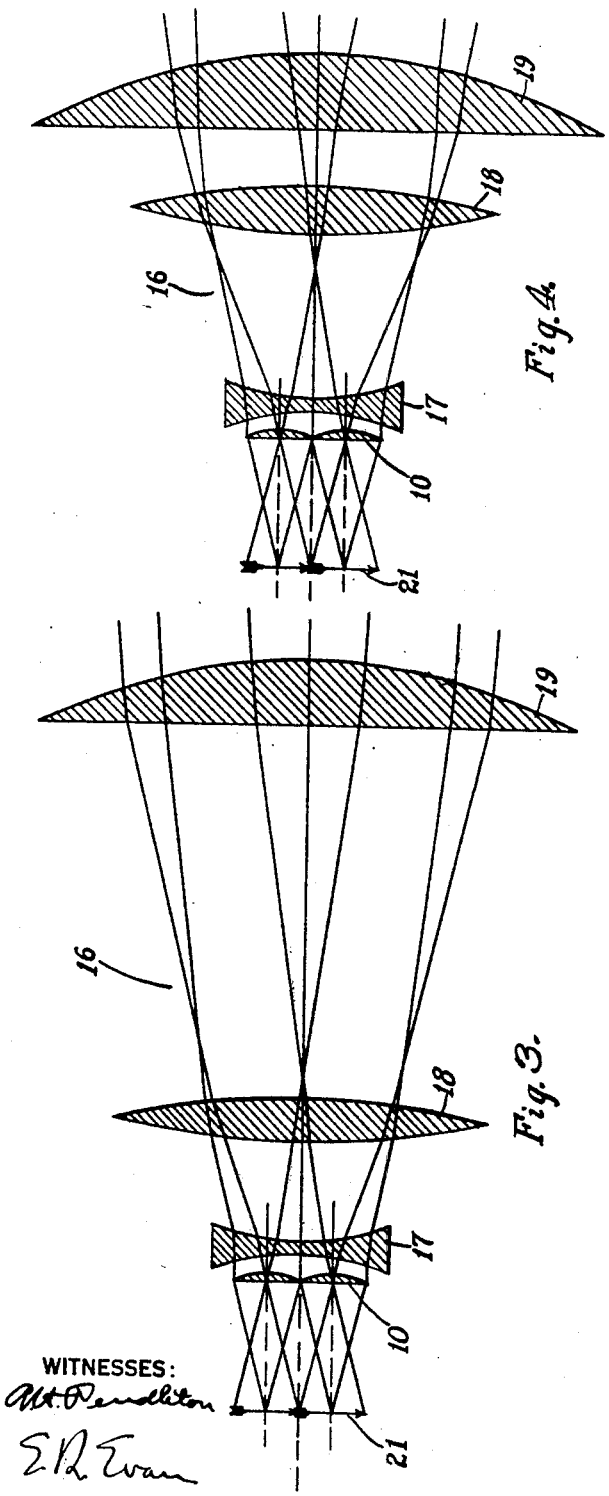
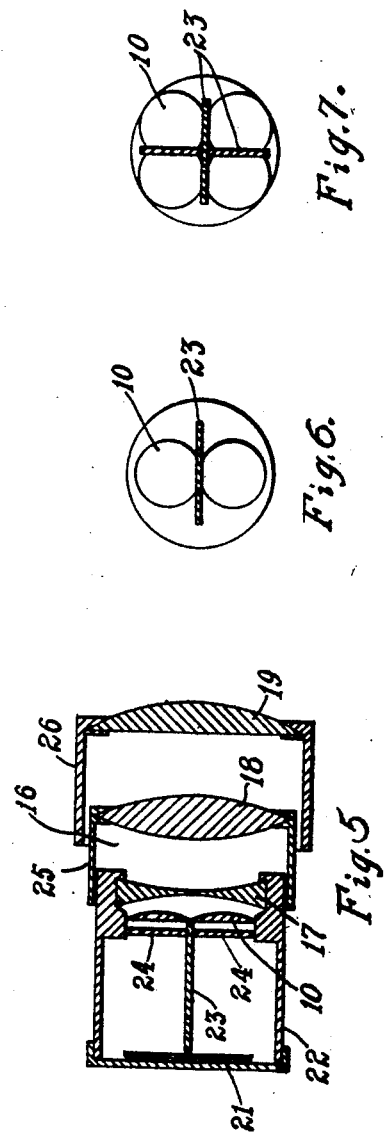
INVENTOR
Harold N. Cox
BY
ATTORNEY Patented Oct. 21, 1930

1,778,754

UNITED STATES PATENT OFFICE

HAROLD N. COX, OF GLEN RIDGE, NEW JERSEY, ASSIGNOR TO COX MULTI-COLOR PHOTO COMPANY, A CORPORATION OF DELAWARE

OPTICAL SYSTEM

Application filed August 7, 1926. Serial No. 127,775.

My invention relates to optical systems and particularly to multiple image color photography.

The object of my invention is to provide an optical system having an objective lens for each image, which shall include focusing means of simplest structure capable of co-ordination with means for changing the angle of view.

A further object of my invention is to provide an optical system, of the above indicated character, that shall be simple and inexpensive to manufacture and effective in its operation.

In practicing my invention I provide a plurality of symmetrically disposed objective lenses, one for each image. The lenses are separated by barriers as are also their respective color filters. The objective lenses are fixed in such position that their back principal foci are at the plane of the film or plate. A positive compound auxiliary lens is also provided which has three members that are placed in front of the objective, and its equivalent focal length is equal to the distance of its front equivalent point from the object or screen.

By adjusting the members of the compound auxiliary lens the system may be focused and the angle of view also may be changed.

In the accompanying drawings:

Fig. 1 is a diagrammatic view of an optical system embodying my invention.

Fig. 2 is a diagrammatic view of the system shown in Fig. 1 with the distance between the members of the auxiliary lens changed for focusing at a greater distance.

Fig. 3 is a diagrammatic view of a modified form of optical system embodying my invention in which the auxiliary lens consists of three members.

Fig. 4 is a diagrammatic view of the optical system shown in Fig. 3 with different distances between the members of the auxiliary lens, to change the angle of view.

Fig. 5 is a sectional view of an optical device for photographing multiple images.

Fig. 6 is a front view of a two objective device and its auxiliary lens, and

Fig. 7 is a front view of a four objective device and its auxiliary lens.

My invention comprises, in general, a plurality of separate objective lens 10, one for each co-planar image of a single object to be formed. I also provide a positive auxiliary lens, as shown in Figs. 1 and 2, as a compound positive lens 13 having two members 14 and 15, and in Figs. 3, 4 and 5 as a compound positive lens 16 with three members 17, 18 and 19.

To accomplish exact register for all distances of the object or screen 20 the objectives 10 must be placed in such position that their back principal foci are at the plane of the film or plate 21 and the positive auxiliary lens 12, 13 or 16, as shown in the different figures placed in front of the objectives 10, must have an equivalent focal length equal to the distance of its front equivalent point from the object or screen 20. With the members so disposed, the point of each image which lies on the principal axis of the corresponding objective will be conjugate to the same point in the object and, therefore, the photographed images may be projected on a screen at any distance irrespective of the distance of the object when the picture was taken.

All of the objectives 10 have substantially equal equivalent focal lengths. The size of the auxiliary lens in such as to intercept the rays passing through all of the objectives 10 and its principal axis is equally distant from and parallel to the principal axes of the several objectives.

The lens 13 of Figs. 1 and 2 comprises a negative lens 14 placed at any convenient distance in front of the objectives, so long as all of the useful rays are intercepted, and a positive lens 15 placed in front of the negative lens at a distance depending upon the distance of the object or screen 20 and upon the relation between the focal lengths of the members.

With the arrangement shown in Figs. 1 and 2, focusing is accomplished by varying the distance between the members 14 and 15 of the auxiliary lens 13. The position of the objectives 10 remains fixed with respect to the plate or film 21.

The angle of view for a film or plate of given dimensions, depends upon the equivalent focal length of the objectives and also upon the relation between the focal lengths of the members 14 and 15 of the auxiliary lens 13. If the focal length of the positive member is equal to the negative focal length of the negative member, the angle of view is equal to that of the objectives. The angle of view is diminished by substituting for the positive member one of greater focal length, or for the negative member, one of less negative focal length. When it is required to increase the angle of view above that of the objectives 10, the negative member of the auxiliary lens is made of less negative focal length than the focal length of the positive member and the negative member is placed in front of the positive member. The angle of view can be changed more easily by using, as shown in Figs. 3, 4 and 5, an auxiliary lens 16 and by relative adjustment of the three members.

Referring to Figs. 5, 6 and 7 of the drawings, a structure is shown comprising a frame 22 for supporting a positive film or plate 21 if the device is a projection machine, or a sensitized film or plate 21 if it is used in a camera. The frame also supports the objective 10 which are separated by barriers 23. Behind the objectives 10 which are two in number, as shown in Fig. 6, if two images are desired or four in number, as shown in Fig. 7, if four images are desired, are an equal number of color filters 24. The back member 17 of the auxiliary lens 16 is also mounted in the frame 22.

A tubular member 25 has a telescoping relation with the member 22 and it supports the intermediate member 18 of the positive auxiliary lens 16. Similarly a telescoping tubular frame 26 carries the front member 19 of the positive auxiliary lens 16.

It will be observed that the auxiliary lens 13 and 16, as shown in the various figures, are all in effect positive lenses. The relative adjustment of the members 22, 25 and 26 will effect the proper focusing of the device and also the angle of view may be changed without adjusting the objectives.

Since each objective 10 is provided with a suitable color filter 24 it will be seen that when the device is used as a camera a number of images are formed at the film or plate 21, each of which has filtered therefrom certain wave lengths of light. Consequently, when the multiple positive photographed image on a film or plate is projected on a screen 20 the images are again recombined to produce a single image in natural colors.

The diagrams of Figs. 3 and 4 illustrate the adjustments of the members 18 and 19 to obtain a change in the angle of view and also for focusing.

With my present arrangement by reason of the use of the barriers 23, there is no overlapping of the images in the camera, and in the projector, each objective transmits light only from its respective photographed image. Also I am able to correct any aberrations by substitution of corrected lenses for any of the optical members, and I preclude the necessity of using prisms which are difficult of adjustment.

Many changes may, however, be made in my invention without departing from the spirit and scope of the same as set forth in the appended claim.

I claim as my invention:

In apparatus for color photography the combination of a frame, a negative lens element borne by said frame, a plurality of objectives also borne by said frame and to the rear of said negative lens element and symmetrically arranged with respect to the axis thereof, a telescopic lens barrel borne by said frame, and a positive lens element borne by said lens barrel coaxially with the negative lens element aforesaid and arranged in front thereof.

In testimony whereof, I have hereunto subscribed my name this twenty-sixth day of July, 1926.

HAROLD N. COX.